United States Patent [19]

Fischer

[11] Patent Number: 5,193,957
[45] Date of Patent: Mar. 16, 1993

[54] FIXING ELEMENT WITH AN EXPANSIBLE SLEEVE

[75] Inventor: Artur Fischer, Waldachtal/Tumlingen, Fed. Rep. of Germany

[73] Assignee: fischerwerke Artur Fischer GmbH & Co KG, Waldachtal/Tumlingen, Fed. Rep. of Germany

[21] Appl. No.: 756,827

[22] Filed: Sep. 9, 1991

Related U.S. Application Data

[63] Continuation-in-part of Ser. No. 353,074, May 15, 1989, abandoned.

[30] Foreign Application Priority Data

May 24, 1988 [DE] Fed. Rep. of Germany ....... 3817512

[51] Int. Cl.⁵ .............................................. F16B 13/06
[52] U.S. Cl. ........................................ 411/55; 411/61; 411/71
[58] Field of Search ................... 411/55, 60, 61, 75, 411/70, 34, 43, 24, 44, 45, 15, 71, 74

[56] References Cited

U.S. PATENT DOCUMENTS

| | | | |
|---|---|---|---|
| 3,703,119 | 11/1972 | Lerich | 411/60 |
| 3,709,089 | 1/1973 | Seetaram | 411/61 |
| 3,855,896 | 12/1974 | Kaufman | 411/74 X |
| 4,287,807 | 9/1981 | Pacharis et al. | 411/55 X |
| 4,609,316 | 9/1986 | Oettl | 411/55 X |
| 4,648,767 | 3/1987 | Fischer | 411/60 |
| 4,688,977 | 8/1987 | Seetaram | 411/61 X |

FOREIGN PATENT DOCUMENTS

| | | | |
|---|---|---|---|
| 591637 | 4/1975 | Switzerland | 411/61 |
| 2181809 | 4/1987 | United Kingdom | 411/34 |

Primary Examiner—Rodney M. Lindsey
Attorney, Agent, or Firm—Michael J. Striker

[57] ABSTRACT

The fixing element for securing an article on a base material includes a shank having a shank portion for receiving an article to be fixed, a reduced diameter portion having opposite ends including a free end and an expander cone located at the free end; and an expansible resilient sleeve received on the reduced diameter portion and having at an end remote from the expander cone lugs which are bent inwards at one obtuse angle. The lugs have end surfaces facing a transition shoulder between the other end of the reduced diameter portion and the shank portion. The expansible resilient sleeve has a length greater than the length of the reduced diameter portion. The expandsible resilient sleeve also has, in an unstressed condition, a sleeve outer diameter larger than the shank portion diameter and a sleeve inner diameter larger than said reduced diameter portion diameter.

2 Claims, 1 Drawing Sheet

FIXING ELEMENT WITH AN EXPANSIBLE SLEEVE

This application is a continuation-in-part of application Ser. No. 353,074, filed May 15, 1989 now abandoned.

BACKGROUND OF THE INVENTION

The present invention relates to a fixing element with an expansible sleeve and, more particularly, to a fixing element securable in a drilled hole in a base material such as masonry and used for attaching of an article to the base.

DE-OS 3,526,784 discloses a fixing element with an expansible sleeve, which is suitable for self-gripping attachment in a drilled hole. The fixing element has a shank on which a resilient expansible sleeve is placed. The expansible sleeve in the unstressed state projects slightly beyond the diameter of the shank. The expansible sleeve can be compressed resiliently as it is inserted into the drilled hole, thus gripping the wall of the hole. As the fixing element is driven in, the friction force generated by the elastic gripping must be overcome. Because of the structure of this expansible sleeve, the shank portion may be pushed unintentionally partially beneath the expansible sleeve, especially when the expansible sleeve is in a position in which it is slightly tilted on a shoulder formed on this shank.

SUMMARY OF THE INVENTION

The object of the present invention is to provide a fixing element with an expansible resilient sleeve that is securely supported on the adjoining shank portion as the fixing element is driven in a drilled hole in a base material.

This object, and others which will be made more apparent hereinafter, is attained in a fixing element of the type described above having a shank and an expansible resilient sleeve received on the shank.

According to the invention, the fixing element comprises a shank having a shank portion for receiving the article to be fixed and having a shank portion diameter, a reduced diameter portion having opposite ends and also having a reduced diameter portion diameter, an expander cone located at one of the opposite ends, and a transition shoulder between the other of the opposite ends and the shank; and an expansible resilient sleeve received on the reduced diameter portion.

The expansible resilient sleeve has lugs at an end remote from the expander cone. These lugs are inwardly bent at an obtuse angle and have lug end surfaces facing the transition shoulder. The expansible sleeve is tapered then in this region by the inwardly bent lugs, thus ensuring that, even if the holes run irregularly, the expansible sleeve does not engage the adjoining shoulder region of the shank. Furthermore, the inwardly bent lugs have the advantage that the expansible sleeve has a tendency to bulge outwards during driving in due to the forces acting on the lugs, so that an improved grip between the expansible sleeve and the wall of the drilled hole in which the fixing element is inserted is achieved. At the same time, the expansible sleeve is centered better as the fixing element is driven in the drilled hole. Thereby an undesireable overlapping of the shoulder region of the shank by the expansible sleeve is also avoided.

However, to achieve the above described advantages certain dimensional relationships between the components of the fixing element must be maintained. Particularly, the expansible resilient sleeve also must have in an unstressed condition a sleeve outer diameter substantially larger than the shank portion diameter and a sleeve inner diameter larger than the reduced diameter portion diameter, so that, when the fixing element is inserted in a drilled hole having a hole diameter nearly equal but less than the shank portion diameter of the fixing element, the expansible sleeve is compressed, so that the fixing element is anchored in the drilled hole. Unless these sleeve diameter relationships are maintained, it will not be possible to compress the sleeve and obtain the desired holding effect in the drilled hole. Furthermore, the resiliency of the expansible sleeve and the difference between the sleeve outer diameter and the shank portion diameter and the difference between the sleeve inner diameter and the shank portion diameter are great enough that the holding effect on the fixing element is sufficient for purposes of anchoring the article.

Also the expansible resilient sleeve should have a length greater than the length of the reduced diameter portion. Because of that, if an additional load is placed on the article anchored by the fixing element, the expander cone moves in the direction of the expansible sleeve and tries to further spread the expansible sleeve to produce an even greater anchoring effect. This results in a particularly strong anchoring.

Furthermore, there is also an outwardly projecting member formed integrally with the expansible resilient sleeve, which extends between the lugs.

BRIEF DESCRIPTION OF THE DRAWING

The objects, features and advantages of the present invention will now be illustrated in more detail by the following detailed description, reference being made to the accompanying drawing in which.

DETAILED DESCRIPTION OF THE PREFERRED EMBODIMENTS

Figure 1:
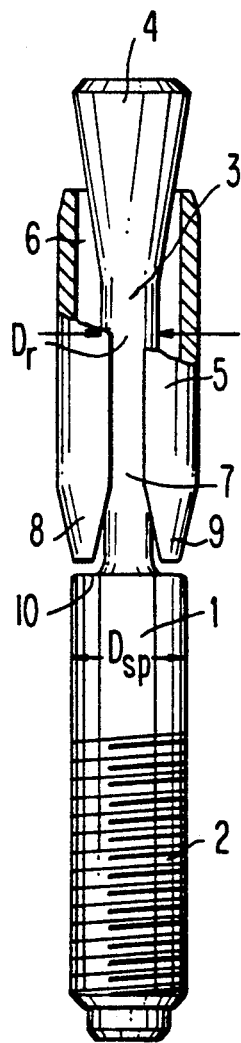
FIG. 1 is a partially cutaway, side view of a fixing element with an expansible sleeve according to the invention.

The fixing element illustrated in FIG. 1 has a shank 1, which at its rear end has a threaded shank portion 2 for anchoring an article and, in its front region, a narrowed or reduced diameter portion 3. The reduced diameter portion 3 has opposite ends, one free end of which is provided with an expander cone 4, generally widening in diameter in the direction of the free end. In the embodiment of the invention shown in the drawing, the reduced diameter portion 3 has a diameter, $D_r$, of 3.7 mm and the threaded shank portion has a diameter, $D_{sp}$, of 6.0 mm. An expansible sleeve 5, for example made of spring steel, is positioned on the reduced diameter portion 3. The expansible sleeve 5 is positioned on the reduced diameter portion 3 with radial and axial play. The expansible sleeve has a sleeve outer diameter, $OD_s$, of about 6.5 mm in an unstressed condition and a sleeve inner diameter, $ID_s$, of about 4.9 mm, also in an unstressed condition. In other words, the wall thickness of the expansible sleeve, t, is 0.8 mm. Thus, there is considerable free space 6 between the expansible sleeve 5 and the tapered or reduced diameter portion 3.

As shown in FIG. 1 the expansible sleeve 5 has a continuous longitudinal slot 7, which allows the expansible sleeve 5 to be resiliently compressed, as it must be when it is inserted in a drilled hole of substantially the same, but necessarily somewhat smaller diameter, than the diameter of the shank portion.

Figure 2:
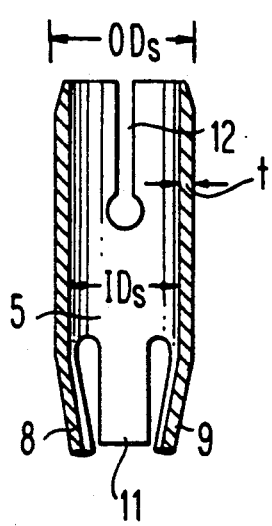
FIG. 2 is a longitudinal cross-sectional view of the expansible sleeve shown in FIG. 1.
Figure 3:
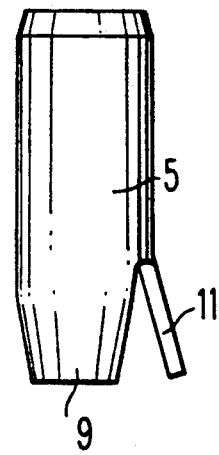
FIG. 3 is a side view of the expansible sleeve of FIG. 1.

FIG. 2 shows a longitudinal section of the expansible sleeve 5 shown in FIG. 1. At its lower end, the expansible sleeve has two oppositely located, inwardly bent lugs 8,9, which contact a shoulder 10 of the shank 1. At the rear side of the expansible sleeve 5 not visible in FIG. 1, an outwardly projecting piece 11, which is an additional means of preventing slippage of the fixing element in the drilled hole under load, projects outwards from the expansible sleeve 5. With its projecting end, the outwardly projecting piece 11 is able to dig into the wall of the hole like a bar, so that the expansible sleeve 5 is securely held in the hole. As shown in FIG. 1, the length of the expansible sleeve is greater than the length of the reduced diameter portion 3, so that the expansible sleeve 5 extends partially over the expander cone 4.

As shown in FIG. 2, the expansible sleeve 5 has at its rear side a slot 12 which, like the longitudinal slot 7, allows the expansible sleeve to expand in the region of the expander cone. The expansion of the expansible sleeve 5 is achieved by drawing the expander cone 4 into the expansible sleeve 5. This is effected, for example, by placing an article to be fastened on the threaded shank portion 2, which protrudes from the mouth of the hole, and then a nut is screwed on and tightened. The expander cone 5 is drawn into the expansible sleeve, while the expansible sleeve is compressed and clamped immovably in the bored hole, which is approximately the diameter of the shank portion 2. For example, when the drilled hole is between 6.0 and 6.3 mm in inner diameter( the usual tolerances), the inner diameter of the expansible sleeve is reduced to about 4.4 mm from 4.9 mm. The tighter the nut is screwed on the threaded shank portion 2, the further is the expander cone 4 drawn into the expansible sleeve 5, and a correspondingly great expansion of the expansible sleeve is attained. As a result of the expansion of the expansible sleeve 5, a reliable attachment of the fixing element in the drilled hole is achieved, which attachment withstands a high tensile stress.

While the invention has been illustrated and described as embodied in a fixing element with an expansible sleeve, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed is new and desired to be protected by Letters Patent is set forth in the appended claims.

I claim:

1. A fixing element for fixing an article to a base, said fixing element comprising a shank, said shank consisting of a shank portion for receiving an article to be fixed to a base, said shank portion having a shank portion diameter, a reduced diameter portion having opposite ends and a reduced diameter potion diameter, an expander cone located at one of said opposite ends, and a transition shoulder between the other of said opposite ends and the shank portion; and an expansible resilient sleeve received on said reduced diameter portion, said expansible resilient sleeve having an end remote from the expander cone and lugs at said end remote from said expander cone, said lugs being inwardly bent at an obtuse angle and having end surfaces facing said transition shoulder, and said expansible resilient sleeve also having an outwardly projecting member formed integrally with said expansible resilient sleeve and extending beyond an outer diameter of the resilient sleeve and between said lugs;

wherein said expansible resilient sleeve has a length greater than a length of said reduced diameter portion and said expansible resilient sleeve also having in an unstressed condition said sleeve outer diameter larger than said shank portion diameter and a sleeve inner diameter larger than said reduced diameter portion diameter, such that, when said fixing element is inserted in a drilled hole having a hole diameter nearly equal but less than the shank portion diameter of the fixing element, said expansible sleeve is compressed, so that said fixing element is anchored in said drilled hole.

2. A fixing element according to claim 1, wherein the shank portion diameter is about 6.0 mm, the reduced diameter portion diameter is about 3.7 mm, the sleeve outer diameter is about .65 mm in the unstressed condition and the expansible sleeve has a wall thickness of about 0.8 mm.

* * * * *